(12) United States Patent
Takahashi

(10) Patent No.: US 6,247,685 B1
(45) Date of Patent: Jun. 19, 2001

(54) SUSPENSION SYSTEMS FOR MOTOR VEHICLES

(75) Inventor: Toru Takahashi, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/242,962

(22) PCT Filed: Aug. 3, 1998

(86) PCT No.: PCT/JP98/03438

§ 371 Date: Feb. 26, 1999

§ 102(e) Date: Feb. 26, 1999

(87) PCT Pub. No.: WO99/07567

PCT Pub. Date: Feb. 18, 1999

(30) Foreign Application Priority Data

Aug. 5, 1997 (JP) .................................................. 9-210692

(51) Int. Cl.[7] .......................................................... F16F 5/00
(52) U.S. Cl. .................. 267/140.15; 701/37; 188/322.15
(58) Field of Search ........................ 267/140.15; 701/36, 701/37, 38, 48, 70; 280/707, 840, 702, 703, 708, 5.519, 5.515, 5.512, 5.507, 6.159; 180/41, 312, 902; 364/424.05

(56) References Cited

U.S. PATENT DOCUMENTS

| | | | |
|---|---|---|---|
| 4,564,214 | 1/1986 | Tokunaga et al. | 280/707 |
| 5,231,583 | * 7/1993 | Lizell | 701/37 |
| 5,322,318 | 6/1994 | Kimura et al. | 280/689 |
| 5,440,488 | * 8/1995 | Yamaoka et al. | 364/424.05 |
| 5,485,377 | 1/1996 | Sasaki et al. | 364/424.05 |
| 5,691,899 | * 11/1997 | Terasaki | 180/5.507 X |
| 5,935,181 | * 8/1999 | Iwasaki | 701/37 |
| 6,002,975 | * 12/1999 | Schiffmann et al. | 701/36 |

FOREIGN PATENT DOCUMENTS

| | | |
|---|---|---|
| 0 706 905 | 4/1996 | (EP) . |
| 5-330325 | 12/1993 | (JP) . |

OTHER PUBLICATIONS

Patent Abstracts of Japan, vol. 097, No. 008 (Aug. 29, 1997).
Patent Abstracts of Japan, vol. 096, No. 002 (Feb. 29, 1996).

* cited by examiner

Primary Examiner—Robert J. Oberleitner
Assistant Examiner—Melanie Talavera
(74) Attorney, Agent, or Firm—Foley & Lardner

(57) ABSTRACT

A suspension system for a motor vehicle includes a shock absorber having a device for allowing a change in a damping-force characteristic, a first sensor for sensing a vertical behavior of the motor vehicle, a second sensor for sensing a roll angle of the motor vehicle during steering operation, a third sensor for sensing a roll rate of the motor vehicle during steering operation, and a control unit. The control unit includes a fundamental control part for carrying out an ordinary control of the damping-force characteristic of the shock absorber in accordance with the vertical behavior as sensed, a first roll restraining control part for carrying out a first roll restraining control in place of the ordinary control when the roll angle as sensed is equal to or greater than a predetermined threshold value, and a second roll restraining control part for carrying out a second roll restraining control in place of the ordinary control when the roll rate as sensed is equal to or greater than a predetermined threshold value. The second roll restraining control provides the damping-force characteristic of the shock absorber higher than that of the first roll restraining control.

12 Claims, 17 Drawing Sheets

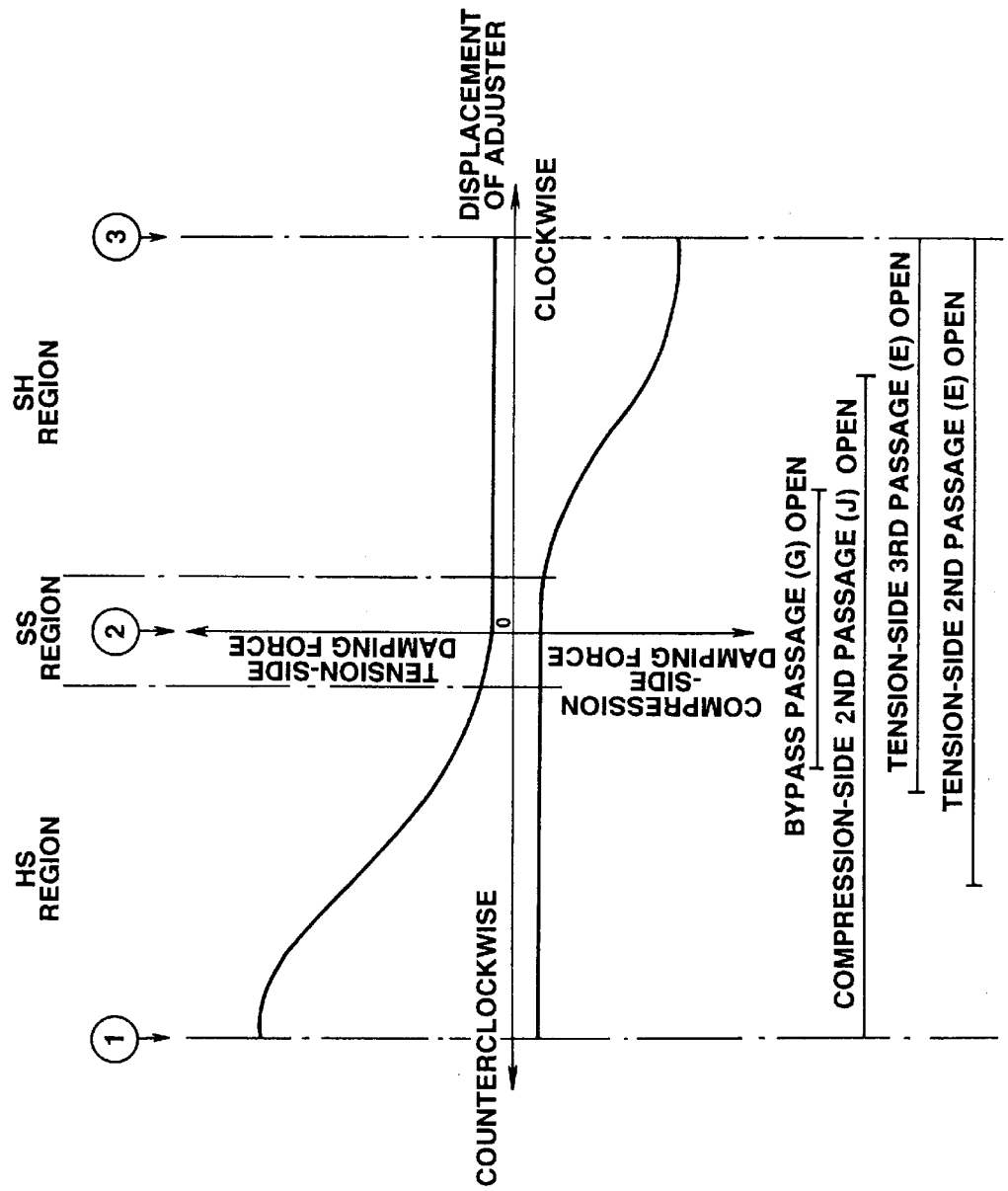

FIG.20

| COMBINED EXAMPLES | CONTROL EXAMPLE (1 OR 2) | | | |
|---|---|---|---|---|
| | ROLL-RATE CONTROL | | ROLL-ANGLE CONTROL | |
| | FRONT WHEEL | REAR WHEEL | FRONT WHEEL | REAR WHEEL |
| ① | 1 | 1 | 1 | 1 |
| ② | 1 | 1 | 2 | 2 |
| ③ | 2 | 2 | 2 | 2 |
| ④ | 2 | 2 | 1 | 1 |

SUSPENSION SYSTEMS FOR MOTOR VEHICLES

BACKGROUND OF THE INVENTION

1. Field of the Invention

The present invention relates generally to suspension systems for motor vehicles which ensure optimum control of the damping-force characteristic of a shock absorber, and more particularly, to the art of improving riding comfort and stability of a vehicular position during steering operation.

2. Description of the Related Art

In connection with the known suspension systems for motor vehicles which ensure control of the damping-force characteristic of a shock absorber, JP-A 5-330325 shows a suspension control system. This system calculates an absolute speed of vertical vibration of a vehicle body. In accordance with the direction of the absolute speed, the system controls a damping coefficient of a shock absorber such that the contraction-side damping coefficient has a small value whereas the extension-side damping coefficient has a large value, or the contraction-side damping coefficient has a large value whereas the extension-side damping coefficient has a small value. By this, without detecting a relative speed between a vehicle body located above the spring and an axle located below the spring, i.e. a sprung-unsprung relative speed, behavior of the vehicle body, i.e. sprung behavior, due to road input can be restrained.

With this known suspension control system, a damping performance of a motor vehicle can be secured with regard to sprung behavior due to road input. However, with regard to damping of behavior in the roll direction when a great lateral acceleration is applied to the vehicle body during steering operation, a controlling force is insufficient due to a moment of inertia in the roll direction being applied to the vehicle body.

Moreover, if the system is constructed to produce a damping force sufficient to damp roll behavior during steering operation, an excessive damping force is produced with respect to road input, resulting in deteriorated riding comfort during ordinary cruising.

It is, therefore, an object of the present invention to provide suspension systems for motor vehicles which ensure optimum control of the damping-force characteristic of a shock absorber in accordance with every aspect of vehicular behavior occurring during non-steering and steering operations to achieve both steering stability and riding comfort.

SUMMARY OF THE INVENTION

One aspect of the present invention lies in providing a method of controlling a suspension system for a motor vehicle, said suspension system including a shock absorber arranged between a vehicle body and a wheel of the motor vehicle and having a device for allowing a change in a damping-force characteristic, the method comprising the steps of:

sensing a vertical behavior of the motor vehicle;

sensing a roll angle of the motor vehicle during steering operation;

sensing a roll rate of the vehicle during steering operation;

carrying out an ordinary control of the damping-force characteristic of the shock absorber in accordance with said vertical behavior as sensed;

carrying out a first roll restraining control in place of said ordinary control when said roll angle as sensed is equal to or greater than a predetermined threshold value; and carrying out a second roll restraining control in place of said ordinary control when said roll rate as sensed is equal to or greater than a predetermined threshold value, said second roll restraining control providing the damping-force characteristic of the shock absorber higher than that of said first roll restraining control.

Another aspect of the present invention lies in providing a suspension system for a motor vehicle with a vehicle body and a wheel, comprising:

a shock absorber arranged between the vehicle body and the wheel and including a device for allowing a change in a damping-force characteristic;

a first sensor for sensing a vertical behavior of the motor vehicle;

a second sensor for sensing a roll angle of the motor vehicle during steering operation;

a third sensor for sensing a roll rate of the motor vehicle during steering operation;

a control unit connected to said shock absorber and said first, second, and third sensors, said control unit including a fundamental control part for carrying out an ordinary control of said damping-force characteristic of said shock absorber in accordance with said vertical behavior as sensed, said control unit including a first roll restraining control part for carrying out a first roll restraining control in place of said ordinary control when said roll angle as sensed is equal to or greater than a predetermined threshold value, said control unit including a second roll restraining control part for carrying out a second roll restraining control in place of said ordinary control when said roll rate as sensed is equal to or greater than a predetermined threshold value, said second roll restraining control providing said damping-force characteristic of said shock absorber higher than that of said first roll restraining control.

BRIEF DESCRIPTION OF THE DRAWINGS

FIG. 6 is a diagram showing the characteristic of damping force vs. pulse-motor stepping position;

FIG. 20 is a table illustrating a control pattern of the shock absorber.

DETAILED DESCRIPTION OF THE INVENTION

Figure 1:
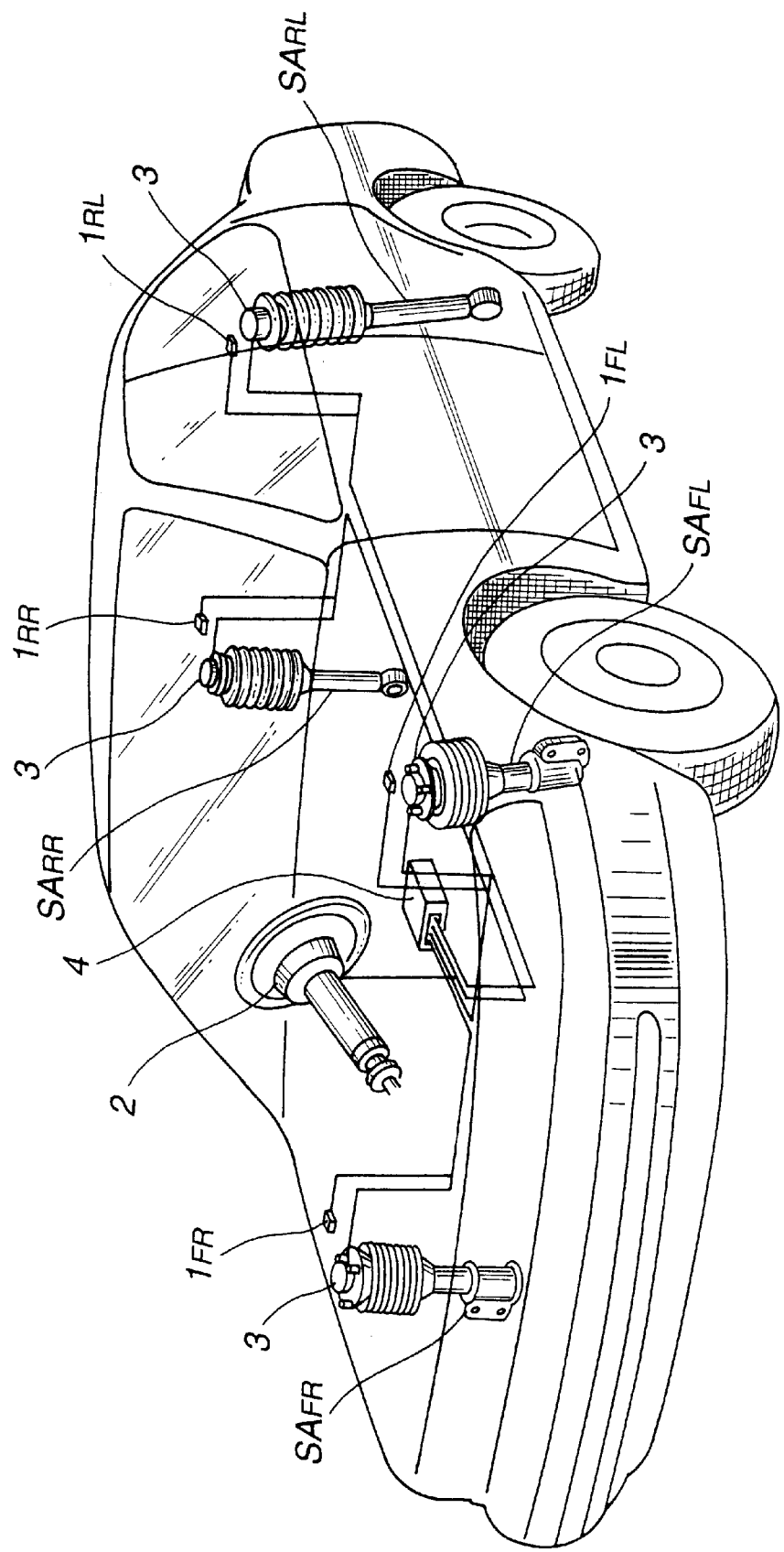
FIG. 1 is a perspective view showing a motor vehicle with a suspension system embodying the present invention.

Referring to FIG. 1, a suspension system for motor vehicles embodying the present invention comprises four shock absorbers $SA_{FR}, SA_{FL}, SA_{RR}, SA_{RR}$, each being arranged between a vehicle body and a corresponding wheel. Note that the shock absorbers will be designated by SA simply when indicating the assemblage and explaining the common structure. Also note that subscripts FR, FL, RR, RL designate front-right, front-left, rear-right, and rear-left wheels, respectively. Moreover, the suspension system comprises a sprung vertical acceleration sensor (refer hereafter to as a vertical G sensor) 1 ($1_{FR}, 1_{FL}, 1_{RR}, 1_{RL}$) arranged in each wheel position to sense a sprung vertical acceleration G ($G_{FR}, G_{FL}, G_{RR}, G_{RL}$) a steering sensor 2 arranged with a steering ST to sense a steering angle Sθ, and a control unit 4 arranged in the vicinity of a driver's seat to output a drive control signal to a pulse motor 3 for each shock absorber $SA_{FR}, SA_{FL}, SA_{RR}, SA_{RR}$ in accordance with signals out of the vertical G sensor 1 and the steering sensor 2.

Figure 2:
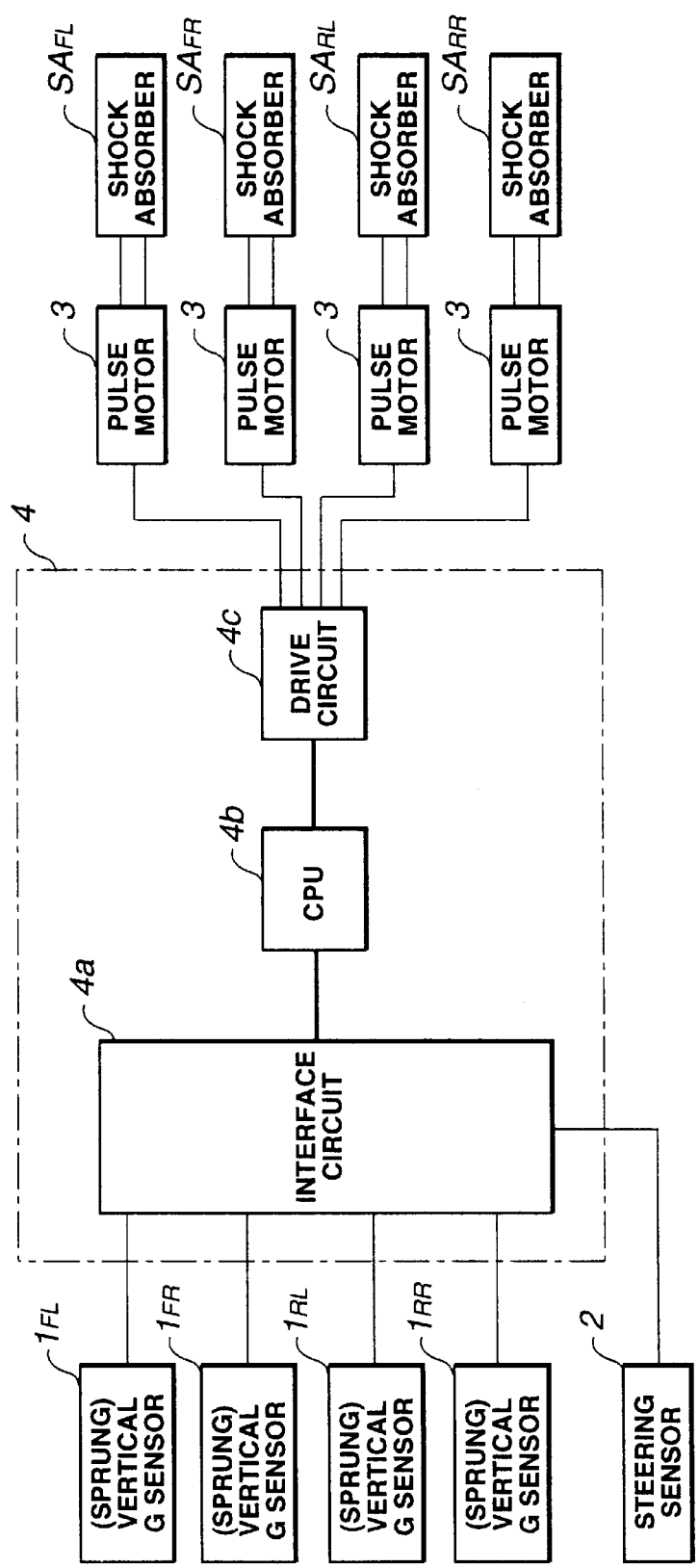
FIG. 2 is a block diagram showing the suspension system.

Referring to FIG. 2, the control unit 4 includes an interface circuit 4a, a central processing unit (CPU) 4b, and a drive circuit 4c. The interface circuit 4a receives a signal of the sprung vertical acceleration G derived from the vertical G sensor 1 and a signal of the steering angle Sθ derived from the steering sensor 2. In accordance with those signals, the control unit 4 carries out control of the damping-force characteristic of the shock absorber SA.

Figure 3:
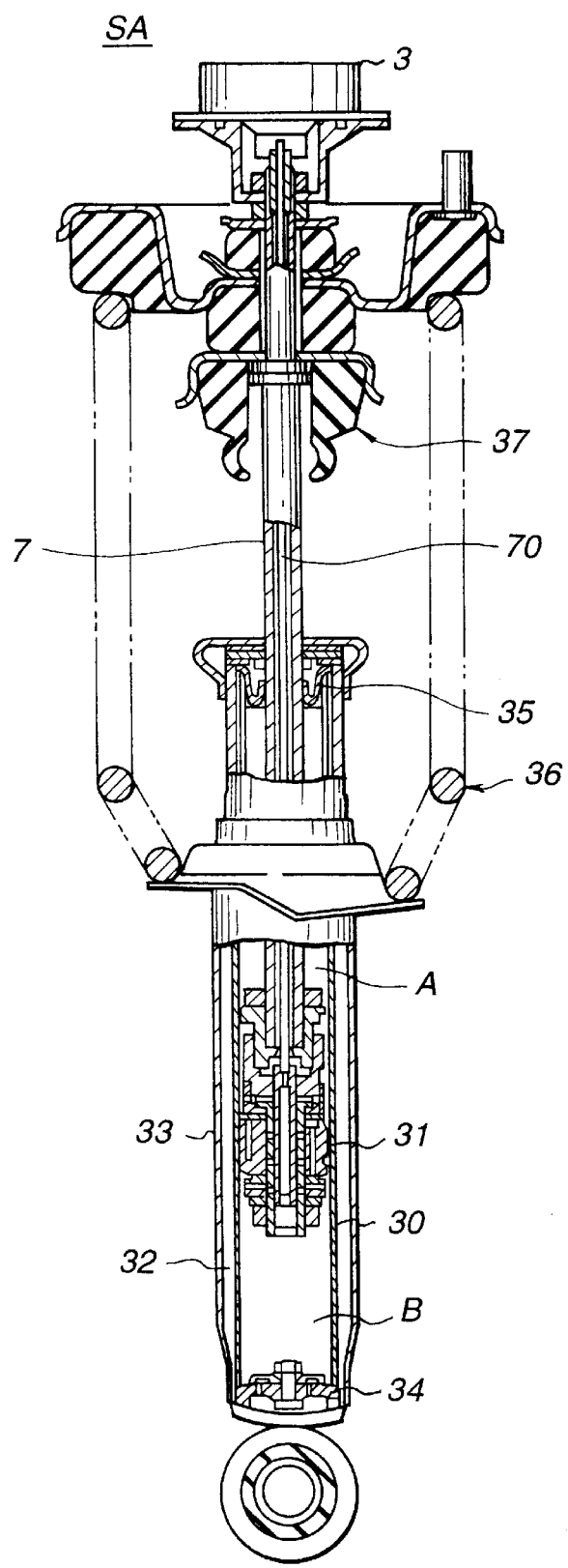
FIG. 3 is a longitudinal section showing a shock absorber.

Referring to FIG. 3, the shock absorber SA includes a cylinder 30, a piston 31 for defining an upper and lower chambers A, B in the cylinder 30, an outer tube 33 for defining a reservoir 32 at the outer periphery of the cylinder 30, a base 34 for defining the lower chamber B and the reservoir 32, a guide member 35 for guiding slide movement of a piston rod 7 connected to the piston 31, a suspension spring 36 interposed between the outer tube 33 and the vehicle body, and a bumper rubber 37.

Figure 4:
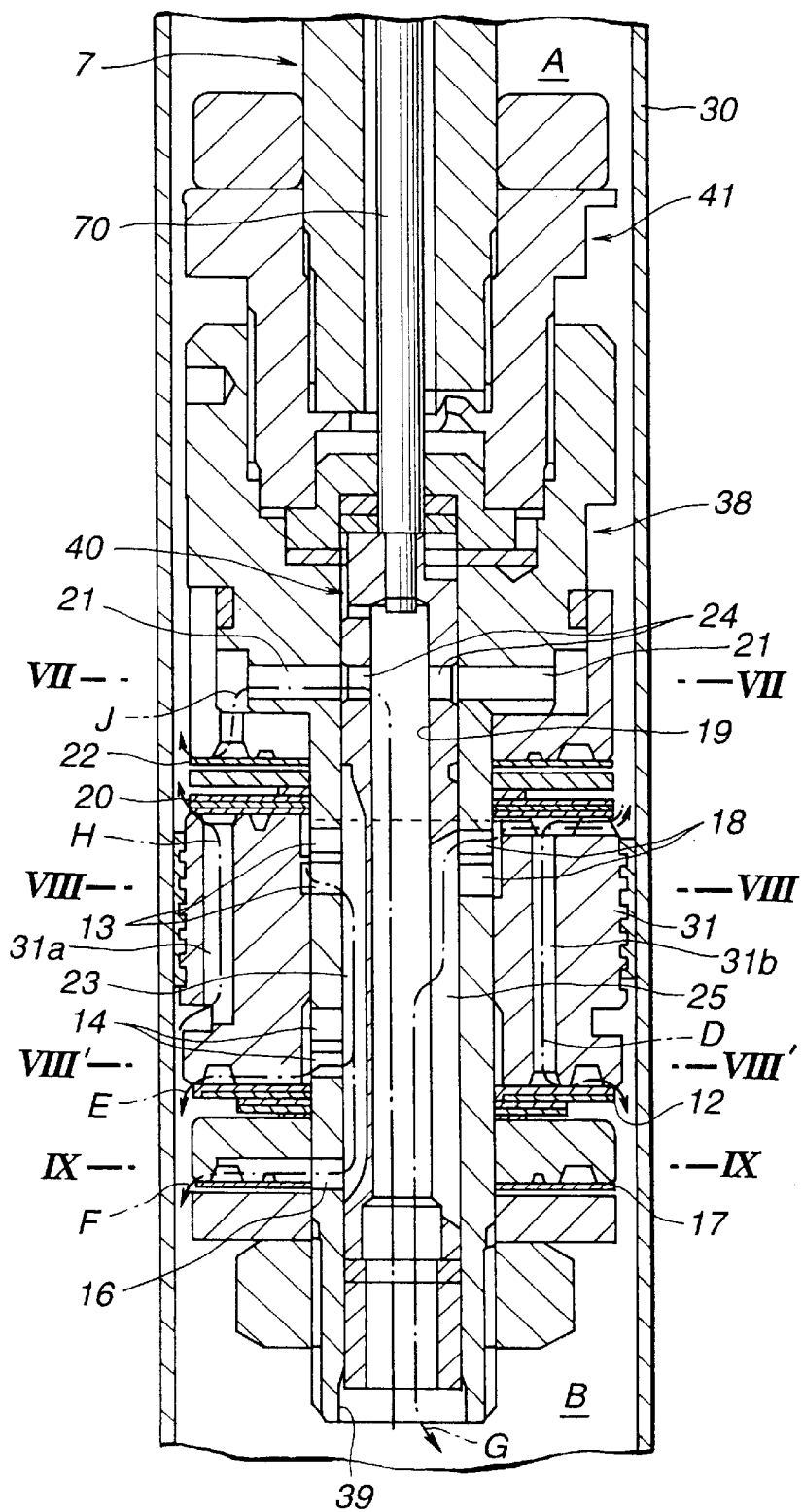
FIG. 4 is an enlarged fragmentary section showing the shock absorber.

Referring to FIG. 4, the piston 31 is formed with through holes 31a, 31b. Compression-side and tension-side damping valves 20, 12 are arranged to close the through holes 31a, 31b, respectively. A stud 38 arranged through the piston 31 is engaged with and fixed to a bound stopper 41 engaged with the head of the piston rod 7. The stud 38 is formed with a communication hole 39 which forms a passage for communication between the upper and lower chambers A, B in bypassing the through holes 31a, 31b, i.e. a tension-side second passage E, a tension-side third passage F, a bypass passage G, and a compression-side second passage J as will be described later. An adjuster 40 is rotatably arranged in the communication hole 39 to vary the sectional area of the passage. Tension-side and compression-side check valves 17, 22 are arranged at the outer periphery of the stud 38 to allow and interrupt fluid flow on the side of the passage formed by the communication hole 39 in the direction of fluid flow. As shown in FIG. 3, the adjuster 40 is rotated by the pulse motor 3 through a control rod 70. Moreover, the stud 38 is formed with first, second, third, fourth, and fifth ports 21, 13, 18, 14, 16 in descending order.

The adjuster 40 is formed with a hollow 19, first and second transverse holes 24, 25 for communication between the inside and outside, and a longitudinal groove 23 formed on the outer periphery.

Four passages are formed between the upper and lower chambers A, B to allow fluid flow in the tension stroke: a tension-side first passage D which extends to the lower chamber B via the through hole 31b and the tension-side damping valve 12 with the inside opened; a tension-side second passage E which extends to the lower chamber B via the second port 13, the longitudinal groove 23, the fourth port 14, and the tension-side damping valve 12 with the outer periphery opened; a tension-side third passage F which extends to the lower chamber B via the second port 13, the longitudinal hole 23, the fifth port 16 and the tension-side check valve 17 opened; and a bypass passage G which extends to the lower chamber B via the third port 18, the second transverse hole 25, and the hollow 19. Three passages are formed between the upper and lower chambers A, B to allow fluid flow in the compression stroke: a compression-side first passage H which extends to the upper chamber A via the through hole 31a and the compression-side damping valve 20 opened; a compression-side second passage J which extends to the upper chamber A via the hollow 19, the first transverse hole 24, the first port 21, and the compression-side check valve 22 opened; and the bypass passage G which extends to the upper chamber A via the hollow 19, the second transverse hole 25, and the third port 18.

Figure 5:
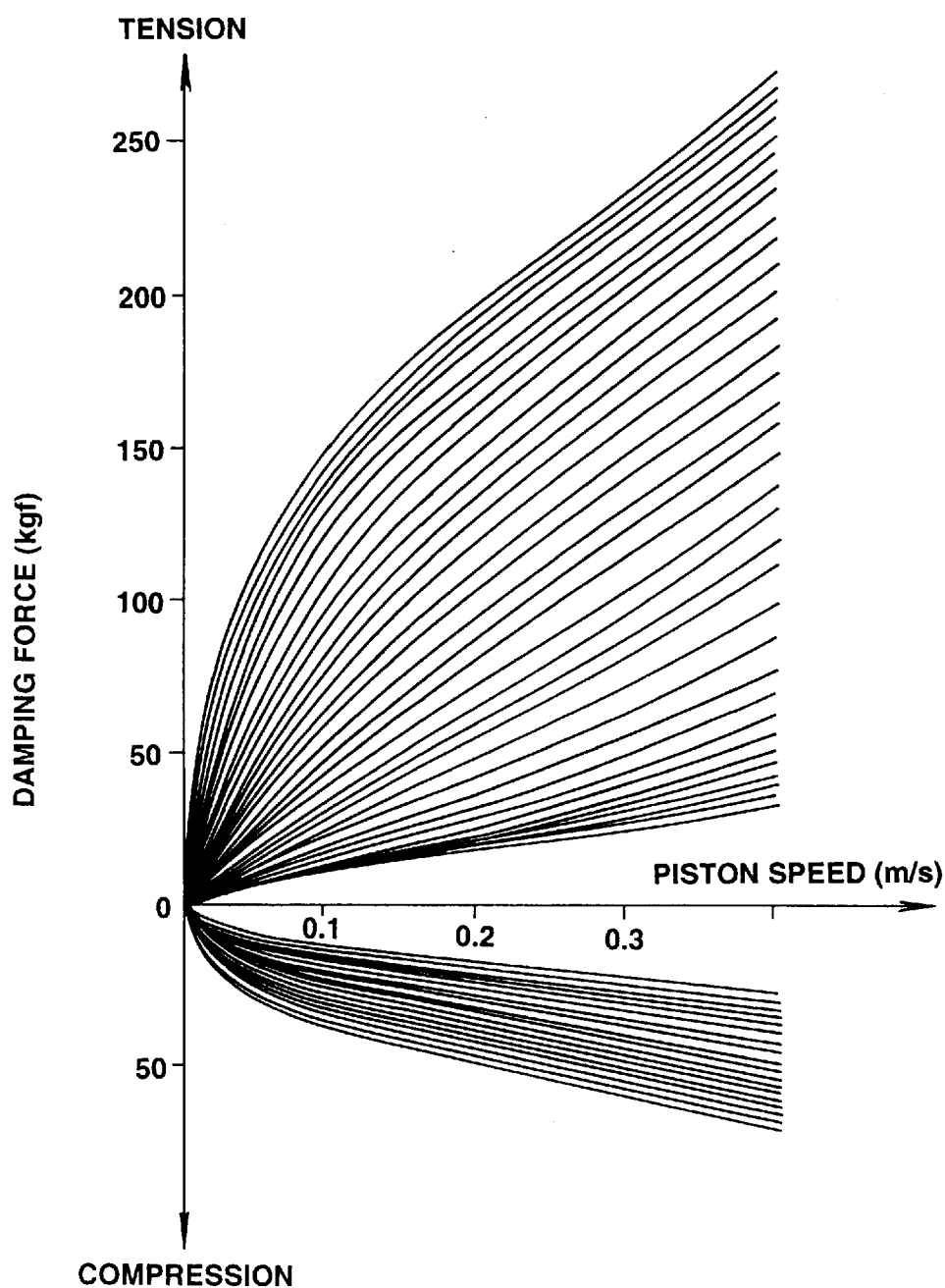
FIG. 5 is a graph showing the characteristic of damping force vs. piston speed.
Figure 7A:
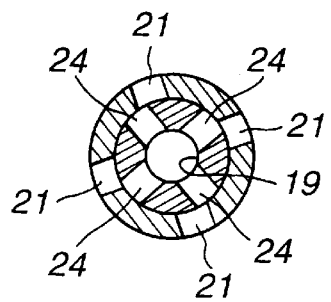
FIGS. 7A–7C are sectional views taken along the line VII—VII in FIG. 4.
Figure 7B:
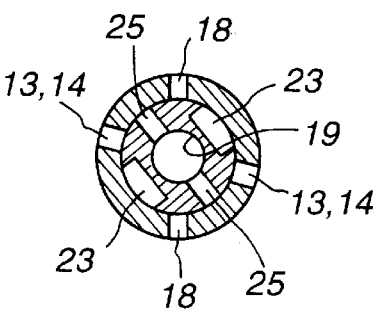
Figure 7C:
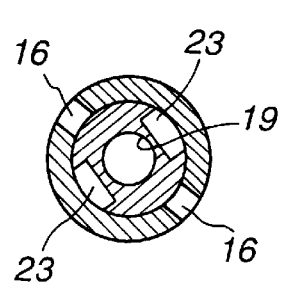
Figure 8A:
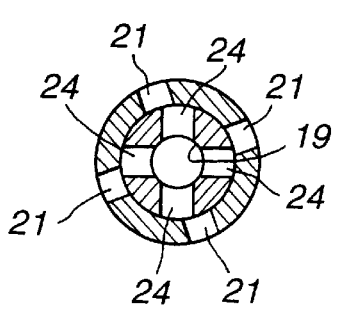
FIGS. 8A–8C are views similar to FIG. 7C, taken along the lines VIII—VIII and VIII'—VIII' in FIG. 4.
Figure 8B:
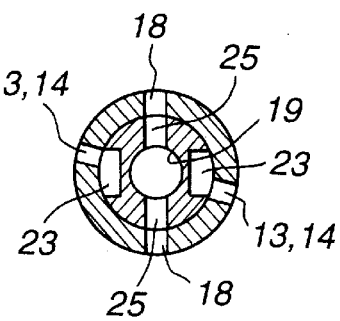
Figure 8C:
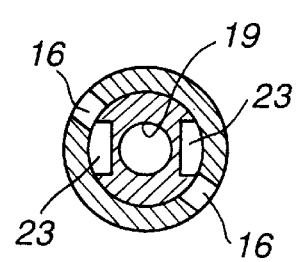
Figure 9A:
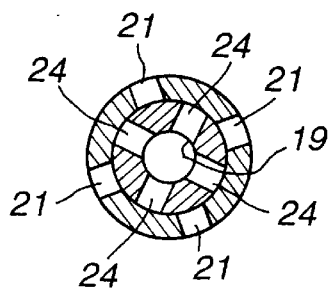
FIGS. 9A–9C are views similar to FIG. 8C, taken along the line IX—IX in FIG. 4.
Figure 9B:
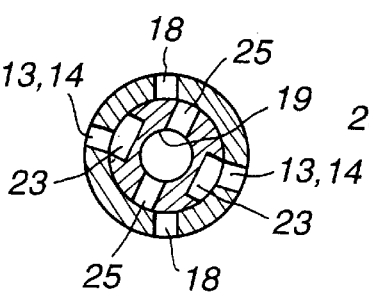
Figure 9C:
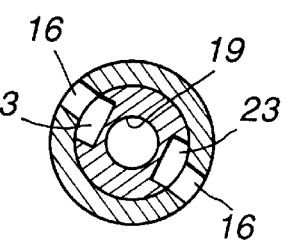

Thus, the shock absorber SA is constructed so that rotation of the adjuster 40 can vary the damping-force characteristic in the multistage way with respect to both the tension and compression sides as shown in FIG. 5. Specifically, referring to FIG. 6, when rotating the adjuster 40 counter-clockwise with both the tension and compression sides set in the soft state (refer hereafter to as a soft region SS), the tension-side damping-force characteristic can be varied in the multistage way, whereas the compression-side damping-force characteristic is fixed in a low damping-force region (refer hereafter to as a tension-side hard region HS). On the other hand, when rotating the adjuster 40 clockwise, the compression-side damping-force characteristic can be varied in the multistage way, whereas the tension-side damping-force characteristic is fixed in a low damping-force region (refer hereafter to as a compression-side hard region SH).

Figure 10:
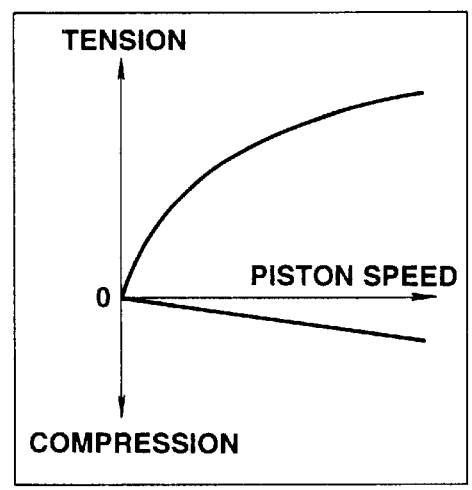
FIG. 10 is a view similar to FIG. 5, showing the damping-force characteristic in the tension-side hard state.
Figure 11:
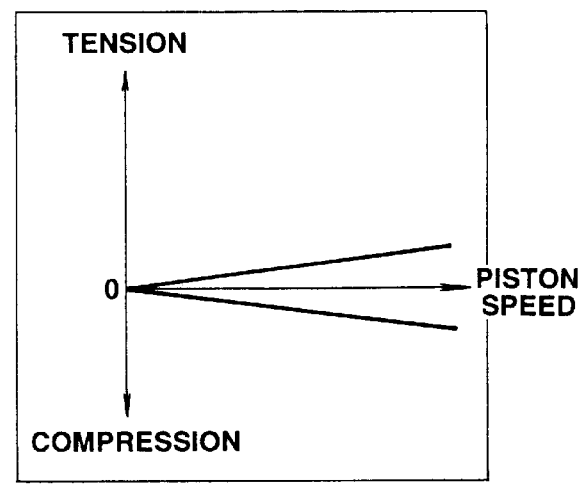
FIG. 11 is a view similar to FIG. 10, showing the damping-force characteristic in the tension-side and compression-side soft states.
Figure 12:
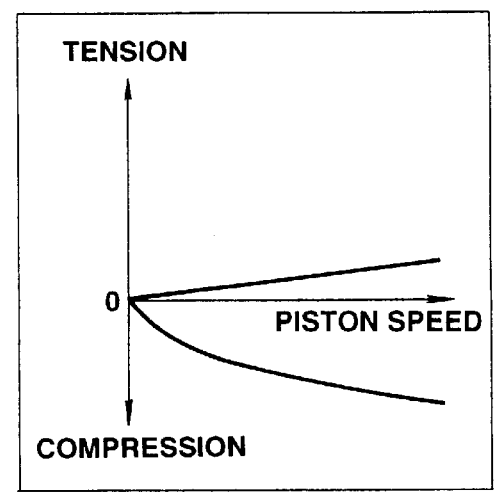
FIG. 12 is a view similar to FIG. 11, showing the damping-force characteristic in the compression-side hard state.

FIGS. 7A–7C, 8A–8C, and 9A–9C show sectional views taken along the lines VII—VII, VIII—VIII and VIII'—VIII', and IX—IX in FIG. 4, respectively, when the adjuster 40 is put in positions $\hat{1}$, $\hat{2}$, $\hat{3}$. FIGS. 10–12 show the damping-force characteristics in the positions $\hat{1}$, $\hat{2}$, $\hat{3}$, respectively.

Figure 13:
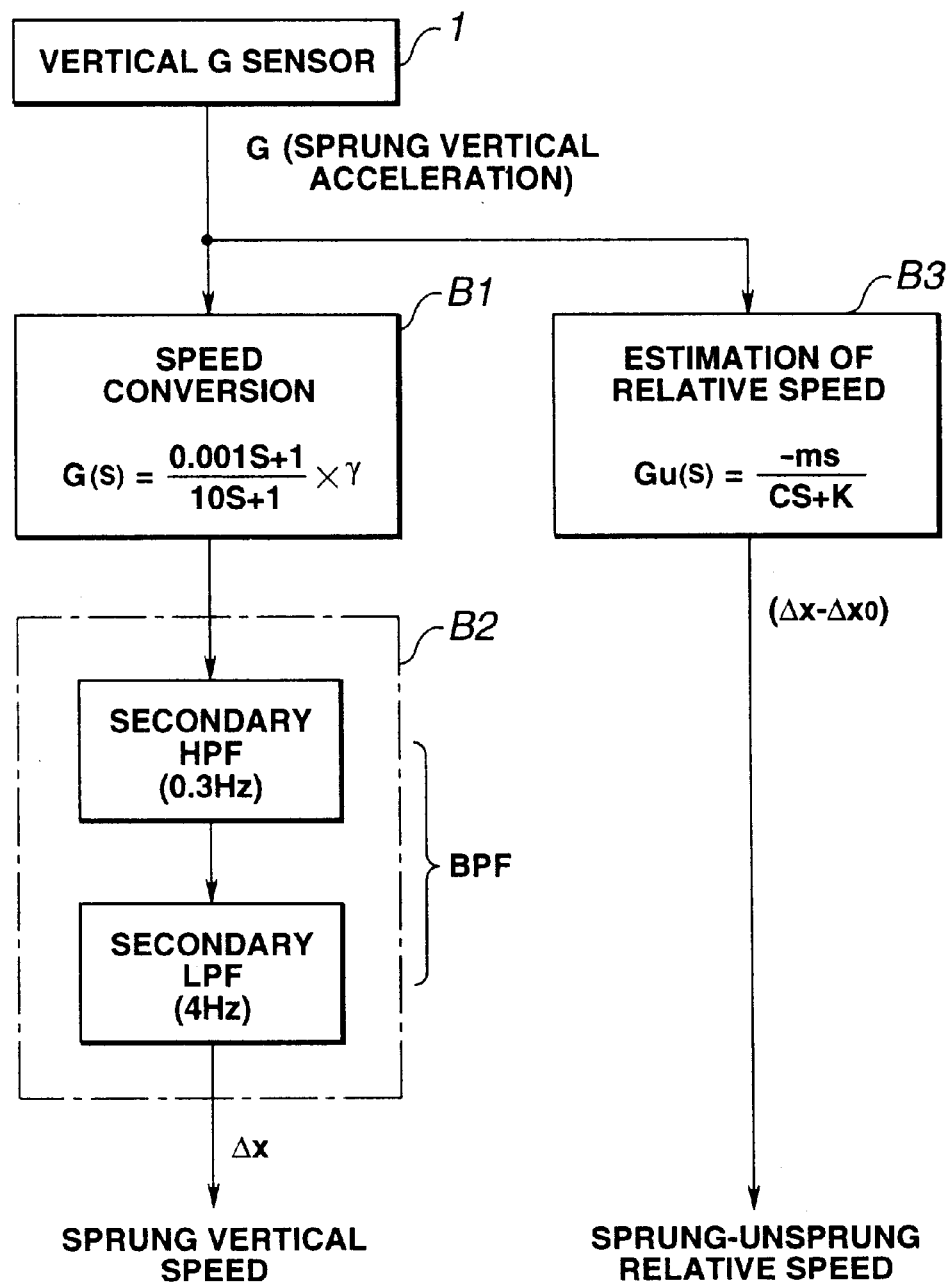
FIG. 13 is a view similar to FIG. 2, showing a signal processing circuit for obtaining signals of sprung vertical speed and sprung-unsprung relative speed.

Referring to FIG. 13, a description will be made with regard to the structure of a signal processing circuit of the control unit 4 for obtaining a sprung vertical speed $\Delta x$ and a sprung-unsprung relative speed $(\Delta x - \Delta x_0)$.

At a block B1, using a formula of phase-lag compensation, the sprung vertical acceleration G ($G_{FR}, G_{FL}, G_{RR}, G_{RL}$) sensed by the vertical G sensor 1 ($1_{FR}, 1_{FL}, 1_{RR}, 1_{RL}$) is converted into a signal of the sprung vertical speed $\Delta x$ in a tower position.

A general formula of phase-lag compensation is given by a transfer-function formula (1):

$$G(s) = (AS+1)/(BS+1) \qquad (1)$$

where A<B.

Figures 14A, 14B:
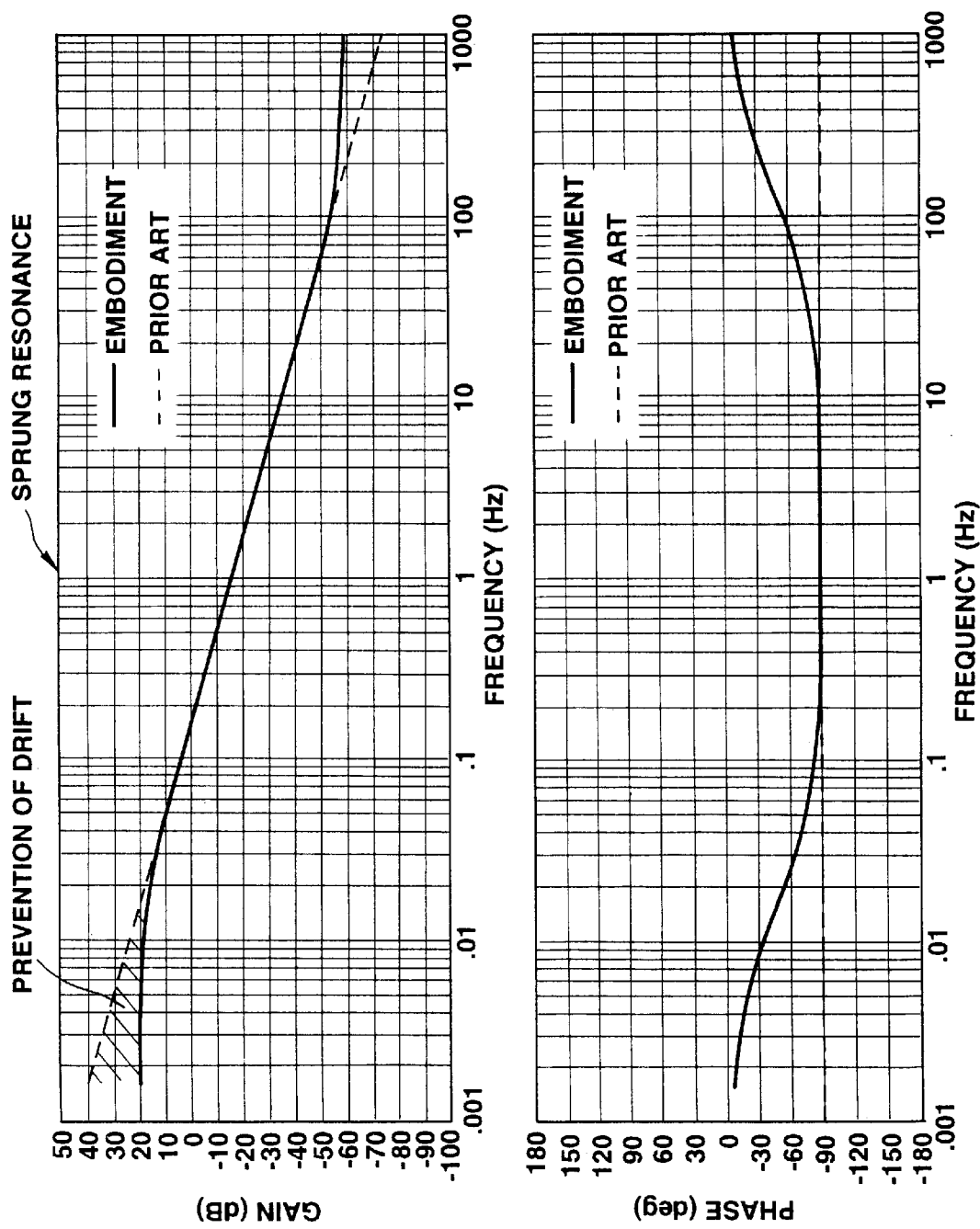
FIG. 14A is a view similar to FIG. 12, showing a gain characteristic of a signal of sprung vertical speed.
FIG. 14B is a view similar to FIG. 14A, showing a phase characteristic of a signal of sprung vertical speed.

A formula of phase-lag compensation for obtaining the phase and gain characteristics equal to those obtained by an integral (1/S) in the frequency band (0.5 to 3.0 Hz) necessary to control of the damping-force characteristic and for reducing the gain in a low frequency (to 0.05 Hz) is given by a transfer-function formula (2):

$$G(s) = [(0.001S+1)/(10S+1)] \times \gamma \qquad (2)$$

where $\gamma$ is a gain for adjusting the gain characteristic of a signal using upon speed conversion by an integral (1/S). In this embodiment, $\gamma$ is set to 10. As a consequence, as seen from the gain characteristic given by a fully drawn line in FIG. 14A, and the phase characteristic given by a fully drawn line in FIG. 14B, only the gain in a low frequency is reduced without deteriorating the phase characteristic in the frequency band (0.5 to 3.0 Hz) necessary to control of the damping-force characteristic. Note that broken lines in FIGS. 14A–14B show the gain and phase characteristics of a signal of the sprung vertical speed $\Delta x$ subjected to speed conversion by an integral (1/S).

At a block B2, a processing in a band-pass filter BPF is carried out to remove frequency components except those in a target frequency band to be controlled. Specifically, the band-pass filter BPF comprises a secondary high-pass filter HPF (0.3 Hz) and a secondary low-pass filter LPF (4.0 Hz) to obtain a signal of the sprung vertical speed $\Delta x$ ($\Delta x_{FR}, \Delta x_{FL}, \Delta x_{RR}, \Delta x_{RL}$) directed to a sprung resonance frequency band.

At a block B3, using a formula (3) of a transfer function Gu(s) from the sprung vertical acceleration G to the sprung-unsprung relative speed $(\Delta x - \Delta x_0)$, a signal of the sprung-unsprung relative speed $(\Delta x - \Delta x_0)$ {$(\Delta x - \Delta x_0)_{FR}$, $(\Delta x - \Delta x_0)_{FL}$, $(\Delta x - \Delta x_0)_{RR}$, $(\Delta x - x_0)_{RL}$} in a tower position is obtained from a signal of the sprung vertical acceleration G sensed by the vertical G sensor 1:

$$Gu(s) = -ms/(cs+k) \qquad (3)$$

where m is a sprung mass, c is a damping coefficient of a suspension, and k is a spring constant of the suspension.

Figure 15:
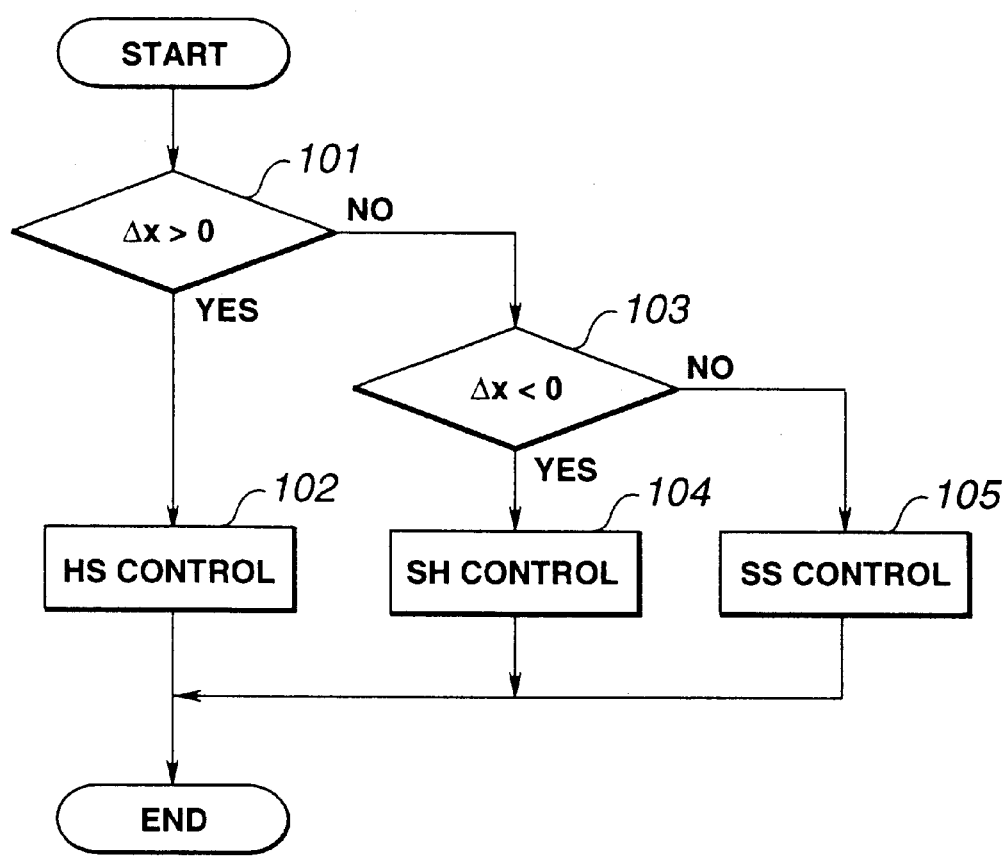
FIG. 15 is a flowchart showing ordinary control for the damping-force characteristic carried out by a control unit.

Referring to FIG. 15, a description will be made with regard to ordinary control included in control of the damping-force characteristic in the control unit 4 and carried out by a fundamental control part thereof. This ordinary control is carried out with respect to each shock absorber $SA_{FR}, SA_{FL}, SA_{RR}, SA_{RR}$.

At a step 101, it is determined whether or not the sprung vertical speed $\Delta x$ has a positive value. If answer is YES, control proceeds to a step 102 where the shock absorber SA is controlled in the tension-side hard region HS. If answer is NO, control proceeds to a step 103.

At the step 103, it is determined whether or not the sprung vertical speed $\Delta x$ has a negative value. If answer is YES, control proceeds to a step 104 where the shock absorber SA is controlled in the compressionside hard region SH. If answer is NO, control proceeds to a step 105.

At the step 105 which is taken when answer at the steps 101, 103 is NO, i.e. a value of the sprung vertical speed $\Delta x$ is zero, the shock absorber SA is controlled in the soft region SS.

Figure 16:
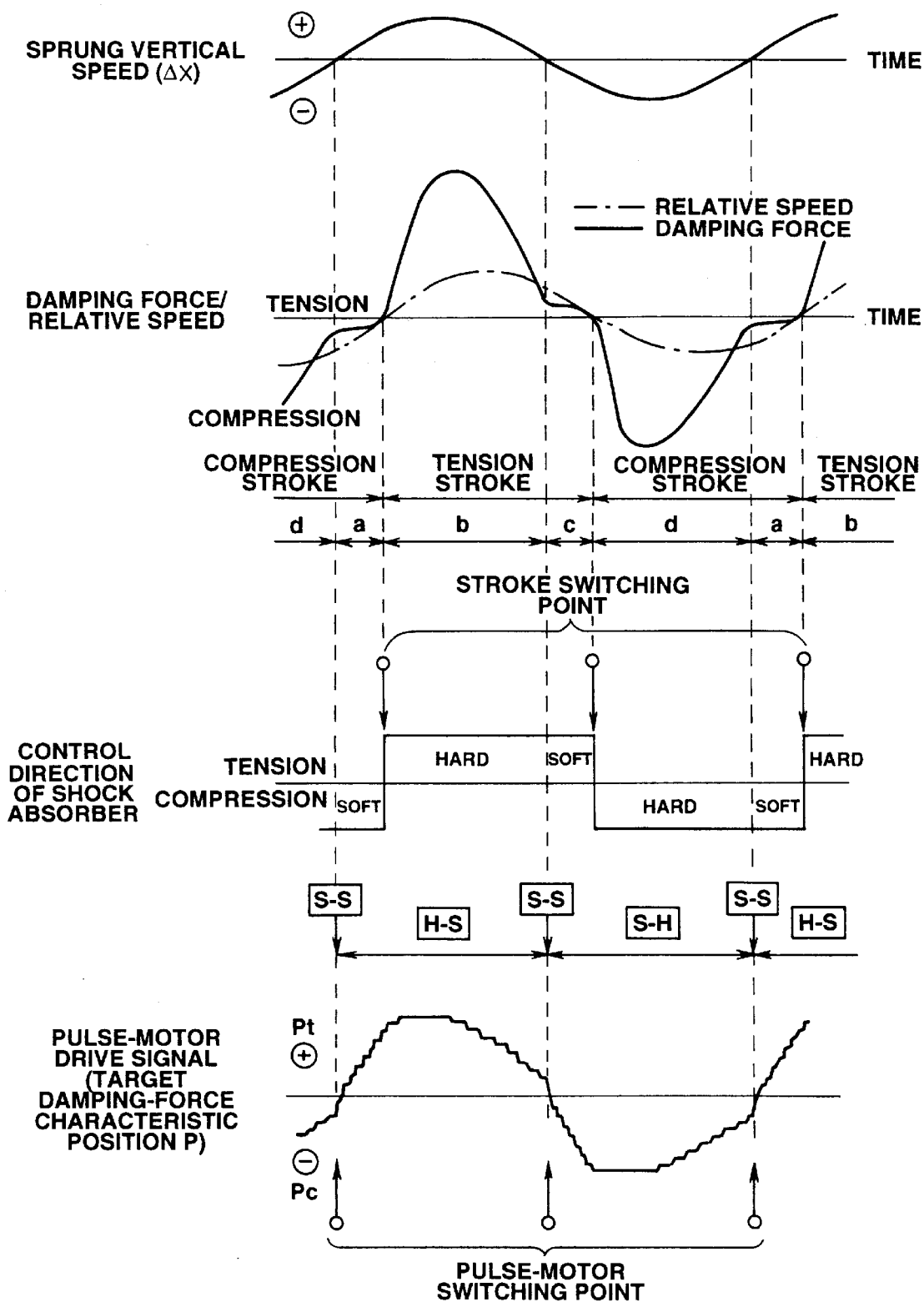
FIG. 16 is a time chart showing ordinary control for the damping-force characteristic carried out by the control unit.

Referring to FIG. 16, control of the damping-force characteristic of the shock absorber SA will be described. When the sprung vertical speed $\Delta x$ is varied as shown in FIG. 16, and when its value is zero, the shock absorber SA is controlled in the soft region SS.

Figure 17:
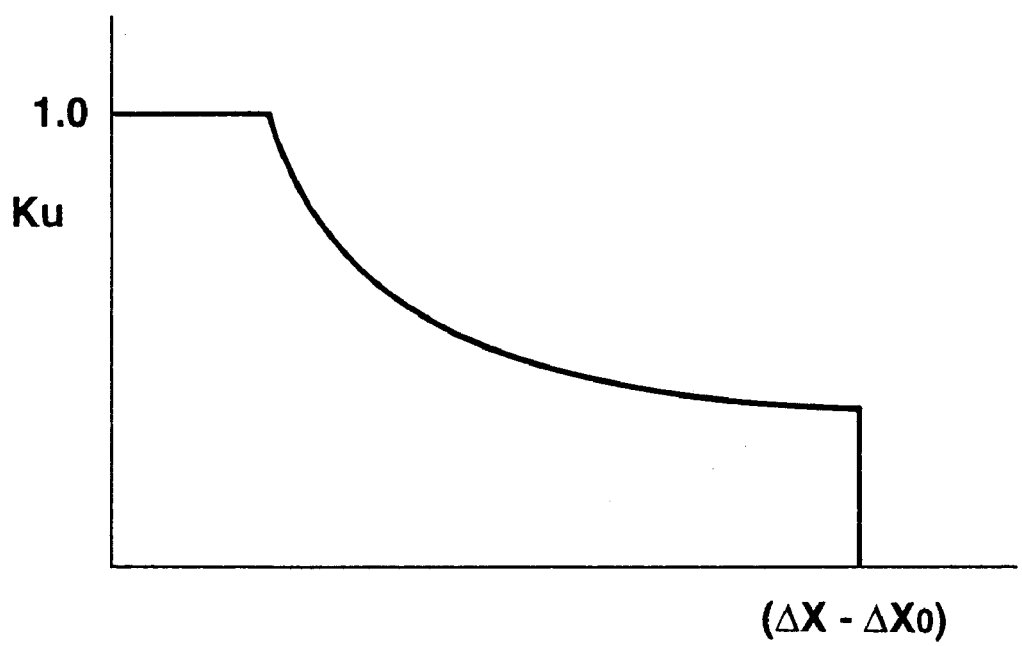
FIG. 17 is a map showing the characteristic of variable control gain vs. sprung-unsprung relative speed.

When a value of the sprung vertical speed $\Delta x$ is positive, the shock absorber SA is controlled in the tension-side hard region HS to fix the tension-side damping-force characteristic in the soft state. And the tension-side damping-force characteristic or a target damping-force characteristic position Pt is changed in proportion to the sprung vertical speed $\Delta x$ and in accordance with a formula (4):

$$Pt = \alpha \cdot \Delta x \cdot Ku \qquad (4)$$

where $\alpha$ is a tension-side constant, and Ku is a control gain having a value which is variably set in inverse proportion to the sprung-unsprung relative speed $(\Delta x - \Delta x_0)$ and in accordance with a map showing the characteristic of the variable control gain vs. the sprung-unsprung relative speed $(\Delta x - \Delta x_0)$ as shown in FIG. 17.

When a value of the sprung vertical speed $\Delta x$ is negative, the shock absorber SA is controlled in the compression-side hard region SH to fix the tension-side damping-force characteristic in the soft state. And the compression-side damping-force characteristic or a target damping-force characteristic position Pc is changed in proportion to the sprung vertical speed $\Delta x$ and in accordance with a formula (5):

$$Pc = \beta \cdot \Delta x \cdot Ku \qquad (5)$$

where $\beta$ is a compression-side constant.

Referring to FIG. 16, a description will be made with regard to switching of the control region of the shock absorber SA, which is included in control of the damping-force characteristic in the control unit 4.

Referring to FIG. 16, in a region a, the sprung vertical speed $\Delta x$ is switched from a negative value (downward direction) to a positive value (upward direction). In the region a, the sprung-unsprung relative speed $(\Delta x - \Delta x_0)$ has a negative value (the shock absorber SA is in the compression stroke), so that the shock absorber SA is controlled in the tension-side hard region HS in accordance with the direction of the sprung vertical speed $\Delta x$. Thus, in the region a, the compression stroke in which the shock absorber SA is at that time shows the soft characteristic.

In a region b, the sprung vertical speed $\Delta x$ has a positive value (upward direction), and the sprung-unsprung relative speed $(\Delta x - \Delta x_0)$ is switched from a negative value to a positive value (the shock absorber SA is in the tension stroke), so that the shock absorber SA is controlled in the tension-side hard region HS in accordance with the direction of the sprung vertical speed $\Delta x$. And the shock absorber SA is in the tension stroke. Thus, in the region b, the tension stroke in which the shock absorber SA is at that time shows the hard characteristic proportional to a value of the sprung vertical speed $\Delta x$.

In a region c, the sprung vertical speed $\Delta x$ is switched from a positive value (upward direction) to a negative value (downward direction). However, the sprung-unsprung relative speed $(\Delta x - \Delta x_0)$ has a positive value (the shock absorber SA is in the tension stroke), so that the shock absorber SA is controlled in the compression-side hard region SH in accordance with the direction of the sprung vertical speed $\Delta x$. Thus, in the region c, the tension stroke in which the shock absorber SA is at that time shows the soft characteristic.

In a region d, the sprung vertical speed $\Delta x$ has a negative value (downward direction), and the sprung-unsprung relative speed $(\Delta x - \Delta x_0)$ is switched from a positive value to a negative value (the shock absorber SA is in the tension stroke), so that the shock absorber SA is controlled in the compression-side hard region SH in accordance with the direction of the sprung vertical speed $\Delta x$. And the shock absorber SA is in the compression stroke. Thus, in the region d, the compression stroke in which the shock absorber SA is at that time shows the hard characteristic proportional to a value of the sprung vertical speed $\Delta x$.

As described above, in this embodiment, when the sprung vertical speed $\Delta x$ and the sprung-unsprung relative speed $(\Delta x - \Delta_0)$ have the same sign, i.e. in the regions d, d, the stroke in which the shock absorber SA is at that time is controlled to show the hard characteristic. When they have different signs, i.e. in the regions a, c, the stroke in which the shock absorber SA is at that time is controlled to show the soft characteristic. That is, the same control as control of the damping-force characteristic based on the skyhook theory is carried out. Moreover, in this embodiment, when switching the stroke of the shock absorber SA, i.e. when passing from the region a to the region b, and from the region c to the region d, i.e. from the soft characteristic to the hard characteristic, the damping-force characteristic position of the coming stroke is already switched to the hard characteristic in the previous region a, c, obtaining switching from the soft characteristic to the hard characteristic without time lag.

The control unit 4 includes a signal processing circuit for obtaining a roll angle R$\theta$ and a roll rate RV. Specifically, in this embodiment, the roll angle R$\theta$ is obtained by filtering a signal of the steering angle S$\theta$ sensed by the steering sensor 2. The roll rate RV is obtained by differentiating a signal of the steering angle S$\theta$. Values of the roll angle R$\theta$ and the roll rate RV are corrected in accordance with a vehicle speed.

Figure 18A:
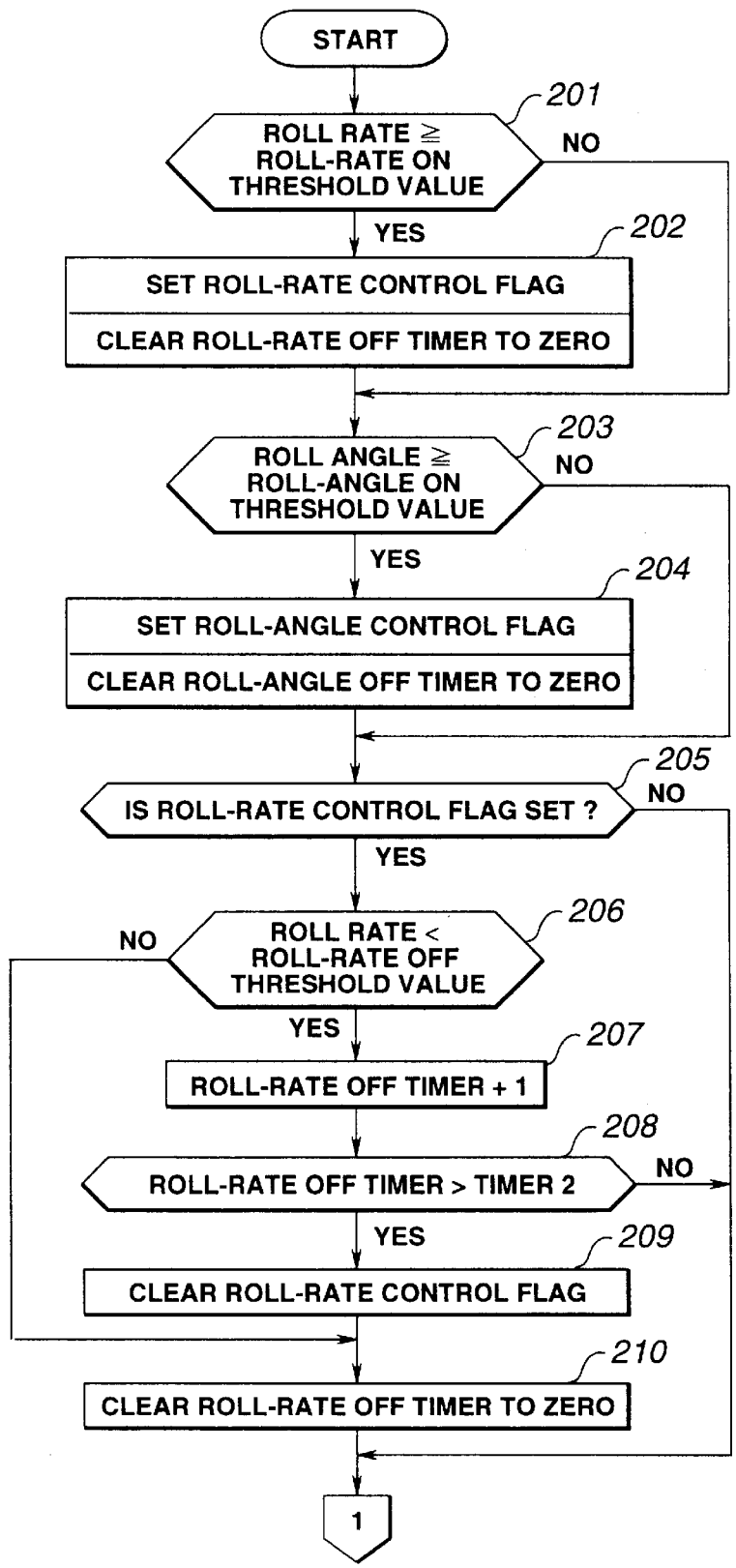
FIGS. 18A–18B are views similar to FIG. 15, showing switching between ordinary control carried out by a fundamental control part and steering-operation control carried out by a roll restraining control part.
Figure 18B:
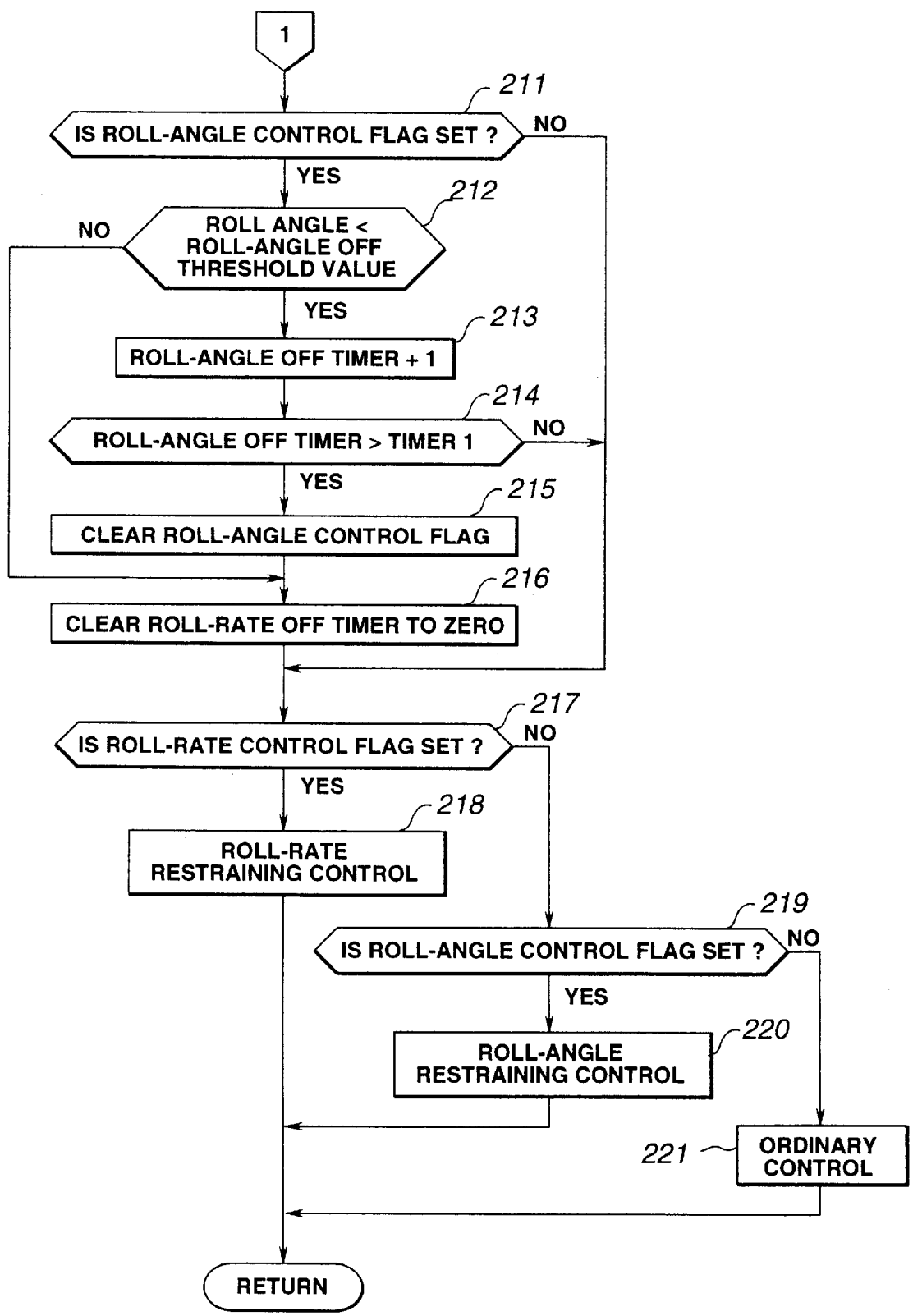

Referring to FIGS. 18A–18B, a description will be made with regard to switching between ordinary control carried out by the fundamental control part and steering-operation control carried out by a roll restraining control part.

Referring to FIG. 18A, at a step 201, it is determined whether or not an absolute value |RV| of a roll-rate signal is equal to or greater than a roll-rate on threshold value. If answer is YES, control proceeds to a step 202 where a roll-rate control flag is set, and count of a roll-rate off timer or second timer is cleared to zero, then, control proceeds to a step 203. At the step 201, if answer is NO, control proceeds to a step 203.

At the step 203, it is determined whether or not an absolute value |R$\theta$| of a roll-angle signal is equal to or greater than a roll-angle on threshold value. If answer is YES, control proceeds to a step 204 where a roll-angle control flag is set, and count of a roll-angle off timer or first timer is cleared to zero, then, control proceeds to a step 205. At the step 203, if answer is NO, control proceeds to a step 205.

At the step 205, it is determined whether or not the roll-rate control flag is set. If answer is YES, control proceeds to a step 206. At the step 206, it is determined whether or not the absolute value |RV| of a roll-rate signal is smaller than a roll-rate off threshold value. If answer is YES, control proceeds to a step 207 where count of the roll-rate off timer or second timer is incremented by one, then, control proceeds to a step 208.

At the step 208, it is determined whether or not count of the roll-rate off timer or second timer is greater than a predetermined value or timer 2. If answer is YES, control proceeds to a step 209 where the roll-rate control flag is cleared. At a subsequent step 210, count of the roll-rate off timer is cleared to zero, then, control proceeds to a step 211 in FIG. 18B.

At the step 206, if answer in NO, control proceeds to the step 210. And at the step 205 or 208, if answer is NO, control proceeds to the step 211.

Referring to FIG. 18B, at the step 211, it is determined whether or not the roll-angle control flag is set. If answer is YES, control proceeds to a step 212. At the step 212, it is determined whether or not the absolute value |R$\theta$| of a roll-angle signal is smaller than a roll-angle off threshold value. If answer is YES, control proceeds to a step 213 where count of the roll-angle off timer or first timer is incremented by one, then, control proceeds to a step 214.

At the step 214, it is determined whether or not count of the roll-angle off timer is greater than a predetermined value or timer 1. If answer is YES, control proceeds to a step 215 where the roll-angle control flag is cleared. At a subsequent step 216, count of the roll-angle off timer is cleared to zero, then, control proceeds to a step 217.

At the step 212, if answer is NO, control proceeds to the step 216. And at the step 211 or 214, if answer is NO, control proceeds to a step 217.

At the step 217, it is determined whether or not the roll-rate control flag is set. If answer is YES, control proceeds to a step 218 where switching to roll-rate restraining control is carried out, then, one flow is completed. If answer is NO, control proceeds to a step 219.

At the step 219, it is determined whether or not the roll-angle control flag is set. If answer is YES, control proceeds to a step 220 where switching to roll-angle restraining control is carried out. If answer is NO, control proceeds to a step 221 where switching to ordinary control is carried out, then, one flow is completed.

The above control flow is repeatedly carried out thereafter.

Figure 19:
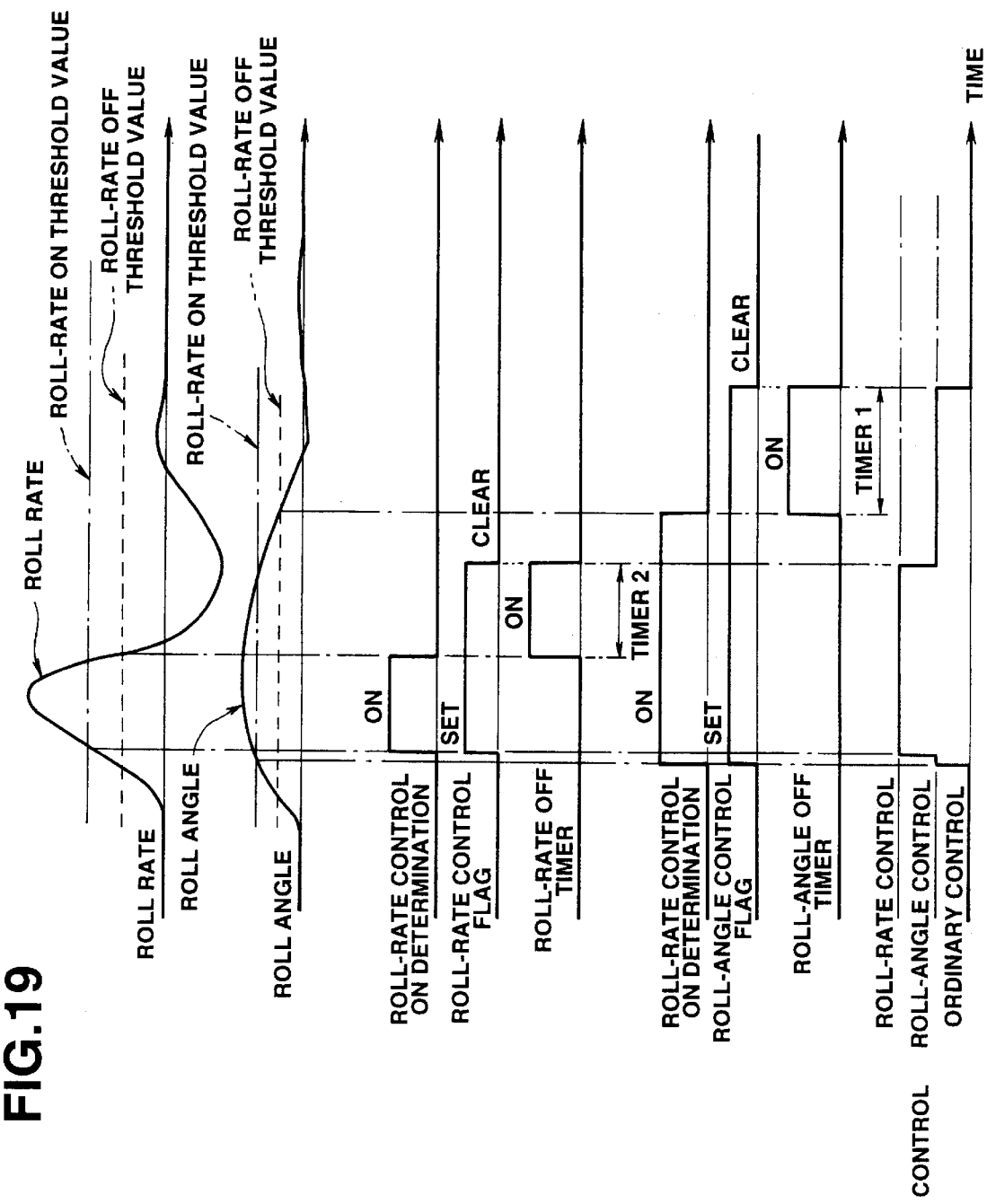
FIG. 19 is a view similar to FIG. 16, showing switching between ordinary control carried out by a fundamental control part and steering-operation control carried out by a roll restraining control part.

Referring to FIG. 19, a further description will be made with regard to switching between ordinary control carried out by the fundamental control part and steering-operation control carried out by the roll restraining control part.

A) During normal cruising

When steering operation is not carried out, or roll behavior produced by steering operation is smaller than a predetermined value, ordinary control is carried out by the fundamental control part, achieving control of the damping-force characteristic with riding comfort respected.

B) During steering operation

When roll behavior produced by steering operation is greater than the predetermined value, steering-operation control is carried out, in place of ordinary control, by a roll-angle restraining control part or a roll-rate restraining control part.

Specifically, when a value of the roll angle R$\theta$ is equal to or greater than the roll-angle on threshold value, switching is carried out from ordinary control to roll-angle restraining control. As soon as a predetermined timer period elapses after a value of the roll angle R$\theta$ is smaller than the roll-angle off threshold value, switching to ordinary control is carried out.

When the roll rate RV is equal to or greater than the roll-rate on threshold value, switching is carried out from ordinary control and roll-angle restraining control to roll-rate restraining control. As soon as a predetermined timer period elapses after a value of the roll rate RV is smaller than the roll-rate off threshold value, switching to ordinary control or roll-angle restraining control is carried out.

During roll-angle restraining control, the damping-force characteristic of the shock absorber SA shows higher value than during ordinary control, restraining vehicular roll during steady turn without deteriorating riding comfort so much, securing steering stability.

During roll-rate restraining control, the damping-force characteristic of the shock absorber SA shows higher value than during roll-angle restraining control, restraining transient vehicular roll during quick steering operation, securing steering stability.

Two examples of steering-operation control in the steering-operation control part will be described.

In the example 1, the damping-force characteristic positions Pt, Pc of the shock absorber SA are fixed to any hard-characteristic positions previously set. The fixed positions are controlled independently with respect to each wheel during both roll-angle restraining control and roll-rate restraining control.

In the example 2, the damping-force characteristic positions Pt, Pc is variably set in real time in accordance with a value of the sprung vertical speed $\Delta x$ so that the stroke of the shock absorber SA shows a predetermined hard characteristic.

Maximum and minimum values of the damping-force characteristic positions are controlled independently with respect to each group of front and rear wheels during both roll-angle restraining control and rollrate restraining control.

FIG. 20 shows four combined examples of the examples 1 and 2 during roll-angle restraining control and roll-rate restraining control.

Having described the present invention in connection with the preferred embodiment, it is noted that the present invention is not limited thereto, and various changes and modifications can be made without departing from the scope of the present invention.

By way of example, in the embodiment, the roll angle and the roll rate are obtained from a steering-angle signal, alternatively, they can be obtained from other signal such as a wheel-speed signal, a lateral-acceleration signal, or a yaw-rate signal.

Moreover, in the embodiment, the shock absorber is controlled in the soft region SS only when a signal of sprung vertical speed is zero. Alternatively, a predetermined insensitive band may be arranged around zero to maintain the damping-force characteristic in the soft region SS as far as a sprung vertical speed is varied within the band. This can prevent control hunting.

What is claimed is:

1. A method of controlling a suspension system for a motor vehicle, said suspension system including a shock absorber arranged between a vehicle body and a wheel of the motor vehicle and having a device for allowing a change in a damping-force characteristic, the method comprising the steps of:

sensing a vertical behavior of the motor vehicle;

sensing a roll angle of the motor vehicle during steering operation;

sensing a roll rate of the vehicle during steering operation;

carrying out a first control of the damping-force characteristic of the shock absorber in accordance with said vertical behavior as sensed;

carrying out a first roll restraining control in place of said first control when said roll angle as sensed is equal to or greater than a predetermined threshold value; and carrying out a second roll restraining control in place of said first control when said roll rate as sensed is equal to or greater than a predetermined threshold value, said second roll restraining control providing the damping-force characteristic of the shock absorber higher than that of said first roll restraining control.

2. A method as claimed in claim 1, wherein said second roll restraining control step is carried out prior to said first roll restraining control step.

3. A method as claimed in claim 1, wherein said predetermined threshold value of said roll angle includes an ON threshold value for restarting said first roll restraining control and an OFF threshold value for interrupting said first roll restraining control, and said predetermined threshold value of said roll rate includes an ON threshold value for starting said second roll restraining control and an OFF threshold value for interrupting said second roll restraining control.

4. A method of controlling a suspension system for a motor vehicle, said suspension system including a shock absorber arranged between a vehicle body and a wheel of the motor vehicle and having a device for allowing a change in a damping-force characteristic, the method comprising the steps of:

sensing a vertical behavior of the motor vehicle;

sensing a roll angle of the motor vehicle during steering operation;

sensing a roll rate of the vehicle during steering operation;

carrying out a first control of the damping-force characteristic of the shock absorber in accordance with said vertical behavior as sensed;

carrying out a first roll restraining control in place of said first control when said roll angle as sensed is equal to or greater than a predetermined threshold value; and carrying out a second roll restraining control in place of said first control when said roll rate as sensed is equal to or greater than a predetermined threshold value, said second roll restraining control providing the damping-force characteristic of the shock absorber higher than that of said first roll restraining control;

wherein said predetermined threshold value of said roll angle includes an ON threshold value for restarting said first roll restraining control and an OFF threshold value for interrupting said first roll restraining control, and said predetermined threshold value of said roll rate includes an ON threshold value for starting said second roll restraining control and an OFF threshold value for interrupting said second roll restraining control; and further comprising the steps of:

cancelling said first roll restraining control as soon as a predetermined period of time elapses after said roll angle as sensed is smaller than said OFF threshold value of said roll angle; and cancelling said second roll restraining control as soon as a predetermined period of time elapses after said roll rate as sensed is smaller than said OFF threshold value of said roll rate.

5. A method as claimed in claim 4, wherein a correction of said on threshold values and off threshold values of said roll angle and said roll rate is carried out in accordance with a vehicle speed.

6. A method as claimed in claim 5, wherein a content of said correction of said on threshold values and off threshold values with respect to a vehicle speed is switched by a selector switch.

7. A suspension system for a motor vehicle with a vehicle body and a wheel, comprising:

a shock absorber arranged between the vehicle body and the wheel and including a device for allowing a change in a damping-force characteristic;

a first sensor for sensing a vertical behavior of the motor vehicle;

a second sensor for sensing a roll angle of the motor vehicle during steering operation;

a third sensor for sensing a roll rate of the motor vehicle during steering operation;

a control unit connected to said shock absorber and said first, second, and third sensors, said control unit including a fundamental control part for carrying out a first control of said damping-force characteristic of said shock absorber in accordance with said vertical behavior as sensed, said control unit including a first roll restraining control part for carrying out a first roll restraining control in place of said first control when said roll angle as sensed is equal to or greater than a predetermined threshold value, said control unit including a second roll restraining control part for carrying out a second roll restraining control in place of said first control when said roll rate as sensed is equal to or greater than a predetermined threshold value, said second roll restraining control providing said damping-force characteristic of said shock absorber higher than that of said first roll restraining control.

8. A suspension system as claimed in claim 7, wherein said second roll restraining control is carried out prior to said first roll restraining control.

9. A suspension system as claimed in claim 7, wherein said predetermined threshold value of said roll angle includes an ON threshold value for starting said first roll restraining control and an OFF threshold value for interrupting said first roll restraining control, and said predetermined threshold value of said roll rate includes an ON threshold value for starting said second roll restraining control and an OFF threshold value for interrupting said second roll restraining control.

10. A suspension system for a motor vehicle with a vehicle body and a wheel, comprising:

a shock absorber arranged between the vehicle body and the wheel and including a device for allowing a change in a damping-force characteristic;

a first sensor for sensing a vertical behavior of the motor vehicle;

a second sensor for sensing a roll angle of the motor vehicle during steering operation;

a third sensor for sensing a roll rate of the motor vehicle during steering operation;

a control unit connected to said shock absorber and said first, second, and third sensors, said control unit including a fundamental control part for carrying out a first control of said damping-force characteristic of said shock absorber in accordance with said vertical behavior as sensed, said control unit including a first roll restraining control part for carrying out a first roll restraining control in place of said first control when said roll angle as sensed is equal to or greater than a predetermined threshold value, said control unit including a second roll restraining control part for carrying out a second roll restraining control in place of said first control when said roll rate as sensed is equal to or greater than a predetermined threshold value, said second roll restraining control providing said damping-force characteristic of said shock absorber higher than that of said first roll restraining control, and wherein said predetermined threshold value of said roll angle includes an ON threshold value for starting said first roll restraining control and an OFF threshold value for interrupting said first roll restraining control, and said predetermined threshold value of said roll rate includes an ON threshold value for starting said second roll restraining control and an OFF threshold value for interrupting said second roll restraining control further comprising:

a first timer for cancelling said first roll restraining control as soon as a predetermined period of time elapses after said roll angle as sensed is smaller than said OFF threshold value of said roll angle; and a second timer for cancelling said second roll restraining control as soon as a predetermined period of time elapses after said roll rate as sensed is smaller than said OFF threshold value of said roll rate.

11. A suspension system as claimed in claim 10, wherein a correction of said on threshold values and off threshold values of said roll angle and said roll rate is carried out in accordance with a vehicle speed.

12. A suspension system as claimed in claim 11, wherein a content of said correction of said on threshold values and off threshold values with respect to a vehicle speed is switched by a selector switch.

* * * * *